United States Patent [19]
Maehara

[11] Patent Number: 5,186,002
[45] Date of Patent: Feb. 16, 1993

[54] FLUID OPERATED BOOSTER

[75] Inventor: Toshifumi Maehara, Saitama, Japan

[73] Assignee: Akebono Brake Industry Co., Ltd., Tokyo, Japan

[21] Appl. No.: 820,335

[22] Filed: Jan. 14, 1992

[30] Foreign Application Priority Data

Feb. 6, 1991 [JP] Japan .................. 3-35080

[51] Int. Cl.⁵ .............................. B60T 13/00
[52] U.S. Cl. ........................ 60/547.1; 91/416
[58] Field of Search .......... 60/547.1, 548.1; 91/416, 47

[56] References Cited

U.S. PATENT DOCUMENTS

| | | | |
|---|---|---|---|
| 4,283,994 | 8/1981 | Belart | 60/547.1 |
| 4,404,803 | 9/1983 | Steffes | 60/547.1 |
| 4,433,543 | 2/1984 | Thomas et al. | 60/547.1 |
| 4,435,960 | 3/1984 | Farr | 60/547.1 |
| 4,976,105 | 12/1990 | Horiuchi et al. | 60/547.1 |

FOREIGN PATENT DOCUMENTS

| | | |
|---|---|---|
| 3114243 | 4/1982 | Fed. Rep. of Germany . |
| 3715566 | 11/1988 | Fed. Rep. of Germany . |
| 1-147773 | 10/1989 | Japan . |

OTHER PUBLICATIONS

European Search Report dated May 12, 1992.

*Primary Examiner*—Thomas E. Denion
*Attorney, Agent, or Firm*—Finnegan, Henderson, Farabow, Garrett and Dunner

[57] ABSTRACT

A fluid operated booster comprising a first valve for controlling the communication between an accumulator and a hydraulic pressure chamber, and a second valve for controlling the communication between the hydraulic pressure chamber and a reservoir, in which, a brake pedal rod is operated to close the second valve and to open the first valve, so that a hydraulic pressure is applied from the accumulator to the hydraulic pressure chamber to act on a power piston, to cause the power piston to provide an operating force, which is transmitted to a master cylinder piston to provide a boosted hydraulic pressure for a brake system; in which, according to the invention, the first valve is a spool valve which is mounted on the brake pedal rod with a predetermined frictional force in such a manner that the spool valve is movable a predetermined distance, and the first valve is closed when the brake system is not in operation, so that no hydraulic pressure from the accumulator is applied to the sliding portion of the brake pedal rod.

8 Claims, 2 Drawing Sheets

FLUID OPERATED BOOSTER

BACKGROUND OF THE INVENTION

1. Field of the Invention

The present invention relates to a fluid operated booster for a vehicle brake system in which a control spool is operated in a switching mode in response to the operation of a brake pedal rod, hydraulic pressure provided by an accumulator is applied through the control spool thus operating a power piston, and power provided by the power piston is applied to a master cylinder piston, to activate the brake system.

2. Related Art

A fluid operated booster for assisting the operating power of a brake system has well been known in the art. One example of the conventional fluid operated booster as disclosed in U.S. Pat. No. 4,435,960 will be described with reference to FIG. 2.

In FIG. 2, reference numeral 51 designates a housing of the conventional fluid operated booster which consists of a first parts 52 and a second 53. In the booster, a boost piston 55 is slidably supported by an annular plug 56, which is disposed between the first and second parts 52 and 53 of the housing 51. The boost piston 55 is provided with an output part 62 and a control part 63 smaller in diameter than the output part 62. The output part 62 and the control part 63 are coupled together through a snap ring 68. A boost chamber 54 is formed in the control part 63, and a control spool 57 is arranged in the chamber 54. The boost chamber 54 is communicated through a through hole 64 with a hydraulic pressure chamber which applies hydraulic pressure to the output part 62. The control spool 57 performs to communicate the boost chamber 54 with a high pressure chamber 58 and a low pressure chamber 59. The high pressure chamber 58 is connected to an accumulator passageway 69, and the low pressure chamber 59 is connected to a passage 70 extending to a reservoir tank. The control spool 57 abuts against an input piston 60 by the elastic force of a spring 61 disposed in the boost chamber 54.

Upon application of an operating force to the input piston 60, the control spool 57 is moved against the elastic force of the spring 16 to the left in FIG. 2, so that the communication of the low pressure chamber 59 with the boost chamber 54 is interrupted, and then the high pressure chamber 58 is communicated with the boost chamber 54 through a hole formed in the control spool 57. As a result, the hydraulic pressure is applied through the boost chamber 54, the hole 64 and the hydraulic pressure chamber to the output part 62 of the boost piston 55, thus operating the master cylinder. This hydraulic pressure assists the operating power of the input piston 60.

When the hydraulic pressure in the boost chamber 54 increases to the extent that the reaction force on the control spool 57 is greater than a predetermined value, the control spool 57 is moved, together with the input piston 60, to the right in FIG. 2 by the hydraulic pressure of the boost chamber, thus interrupting the communication of the boost chamber 54 with the high pressure chamber and the low pressure chamber. When the operating force applied to the input piston 60 decreases, the input piston 60 and the control spool 57 are moved to the right in FIG. 2, to communicate the boost chamber 54 with the low pressure chamber 59, as a result of which the brake is released.

In the above-described fluid operated booster, the high hydraulic pressure is applied from the accumulator to seal members 67 and 66 provided at the output part 62 and the control part 63 of the boost piston. Hence, relatively high frictional resistance is provided between the housing 51 and the seal members 67 and 66, thus resisting the movement of the boost piston. That is, the resistance makes it difficult to smoothly move the boost piston 55. As for the seal member 66 of the control part 63, the high hydraulic pressure from the accumulator is applied to it at all times. Therefore, the seal member 66 is strongly pushed against the boost piston, so that the frictional resistance between the seal member and the boost piston is high, thus impeding the initial smooth movement of the boost piston. Furthermore, in the fluid operated booster, the control spool 57 is urged towards the input piston 60 by the spring 61, and therefore the booster is large in axial length, and rather intricate in structure, and it is difficult to miniaturize.

In order to eliminate the direct application of the hydraulic pressure from the accumulator to the seal members thereby allowing the smooth movement of the boost piston, Unexamined Japanese Utility Model Application (OPI) No. Hei. 1-147773 (the term "OPI" as used herein means an "unexamined published application") has proposed a fluid operated booster. However, the booster thus proposed is still disadvantageous in that the housing is bulky because the movement of the spool valve is transmitted through a link member to the power piston; that is, it is difficult to miniaturize the booster.

SUMMARY OF THE INVENTION

In view of the foregoing, an object of the present invention is to provide a fluid operated booster smooth in operation, simple in structure, and small in size in which the application of high hydraulic pressure from the accumulator to the seal members is avoided.

Another object of the invention is to provide a fluid operated booster in which a friction member is provided between the control spool and the input piston so that the movement of the input piston is transmitted through the friction member to the control spool.

The foregoing and other objects of the invention has been achieved by a provision of a fluid operated booster comprising a first valve for controlling the communication between an accumulator and a hydraulic pressure chamber, and a second valve for controlling the communication between the hydraulic pressure chamber and a reservoir, in which a brake pedal rod is operated to close the second valve and to open the first valve, so that a hydraulic pressure is applied from the accumulator to the hydraulic pressure chamber to act on a power piston, to cause the power piston to provide an operating force, which is transmitted to a master cylinder piston to provide a boosted hydraulic pressure for a brake system; in which, according to the invention, the first valve is a spool valve which is mounted on the brake pedal rod with a predetermined frictional force in such a manner that the spool valve is movable a predetermined distance, and the first valve is closed when the brake system is not in operation, so that no hydraulic pressure from the accumulator is applied to the sliding portion of the brake pedal rod.

According to the fluid operated booster of the invention, when the brake pedal rod is moved by the operating force, the first spool valve is moved through the friction member, so that the accumulator is communicated through its flow path with the hydraulic pressure chamber, while the communication between the hydraulic pressure chamber and the lower pressure chamber is interrupted which has been established through the second spool valve made up of the groove formed in the brake pedal rod and the groove formed in the power piston. As a result, the high hydraulic pressure from the accumulator is applied to the hydraulic pressure chamber, thus driving the power piston. The movement of the power piston is transmitted through the booster rod to the master cylinder piston, to operate the brake system. When the brake system is not in operation, the high hydraulic pressure from the accumulator is blocked by the spool valve; that is, it is not directly applied to the seal member provided between the brake pedal rod and the plug.

When the force of pushing the brake pedal rod by hydraulic pressure (which is formed by the hydraulic pressure applied to the difference in sectional area between the large diameter portion and the small diameter portion of the brake pedal rod) becomes greater than the input force applied through the brake pedal rod, the control spool is moved to the right together with the brake pedal rod, to close the flow path connected to the accumulator. When the force of pushing the brake pedal rod to the left is increased again, the control spool is moved to the left together with the brake pedal rod, to communicate the hydraulic pressure chamber with the accumulator. Thus, the power boosting operation is carried out while the hydraulic pressure proportional to the input force is being applied to the hydraulic pressure chamber.

DESCRIPTION OF THE PREFERRED EMBODIMENT

One example of a fluid operated booster, one embodiment of this invention, will be described with reference to FIG. 1.

Figure 1:
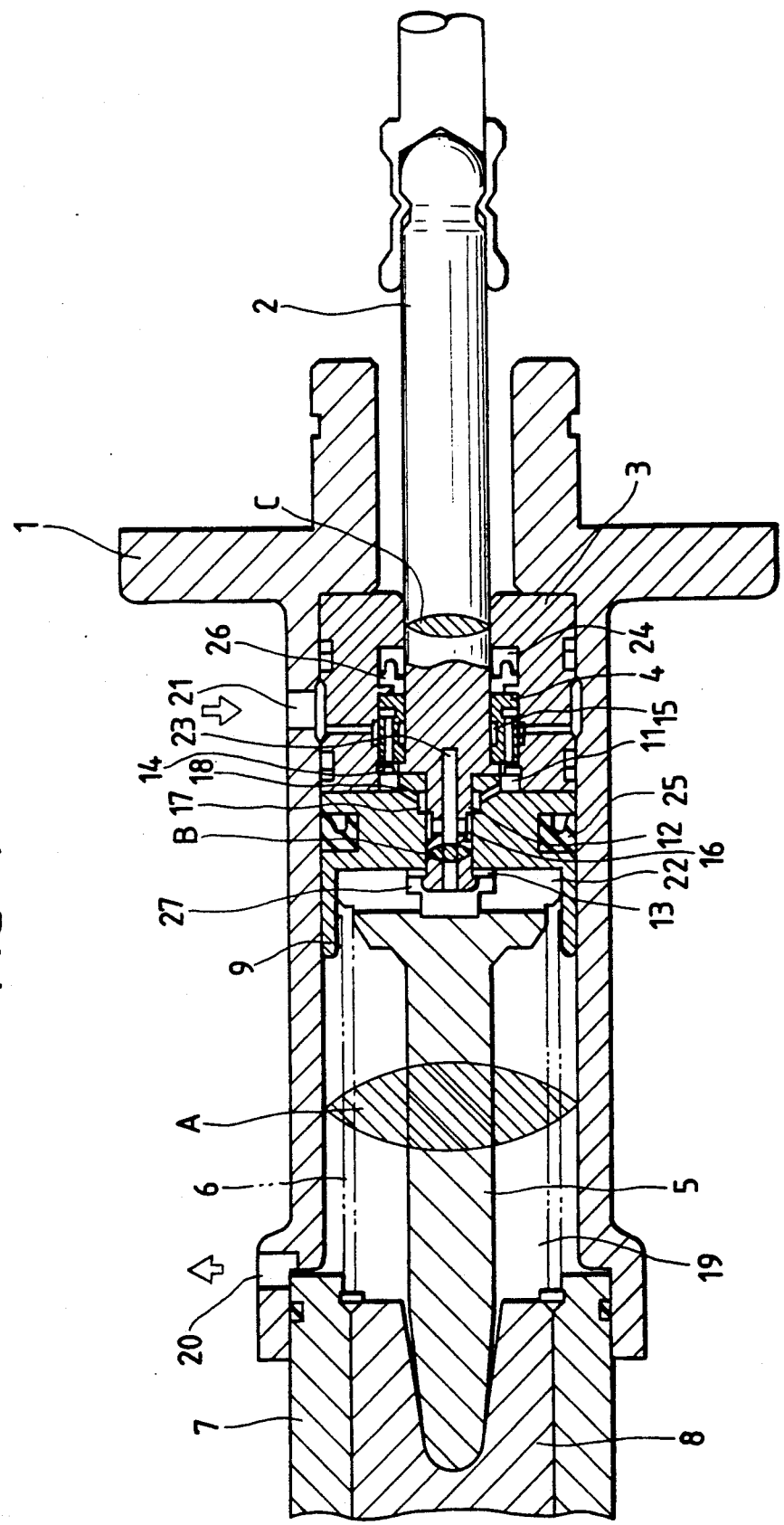
FIG. 1 is a sectional side view of one example of a fluid operated booster.

In FIG. 1, reference numeral 1 designates a housing, to one end of which a master cylinder housing 7 is connected. A master cylinder piston 8 is slidably fitted in the master cylinder housing 7. A plug 3 is fixedly fitted in the other end portion of the housing 1. A brake pedal rod 2 is slidably inserted into the plug 3. A power piston 9, which has a sectional area A, is slidably arranged between the plug 3 and the master cylinder piston 8. A seal 25 is fitted in a groove formed in the cylindrical wall of the power piston.

A booster rod 5 is provided between the power piston 9 and the master cylinder piston 8, and it is urged towards the power piston 9 by a return spring 6. The power piston 9 and the master cylinder piston 8 define a low pressure chamber 19, which is connected through a flow path 20 to the reservoir. The low pressure chamber 19 is communicated through a flow path 22 formed in the booster rod 5 with a flow path 23 formed in the brake pedal rod 2 (described later).

The brake pedal rod 2 is made up of a large diameter portion having sectional area C, and a small diameter portion having sectional area B. The small diameter portion is slidably fitted in the power piston 9. A stopper 13 is mounted at the end of the small diameter portion of the brake pedal rod 2. With the aid of this stopper 13, the brake pedal rod 2 is moved horizontally in FIG. 1 together with the power piston 9 when the booster is operated. More specifically, the stopper 13 is engaged with a step 27 formed in the booster rod 5. The depth of the step 27 is such that, when the brake pedal rod 2 is moved initially, the stopper 13 will not interfere the step 27, and the flow path of a spool valve (described later) is completely switched. As was described above, the flow path 23 is formed in the end portion of the brake pedal rod 2, and it is communicated with a groove 16 formed in the cylindrical outer wall of the brake pedal rod 2.

The power piston 9 has a hole through which the brake pedal rod 2 extends. The hole of the power piston a has a groove 17 formed in the cylindrical wall. The groove 17 together with the aforementioned groove 16 forms a second spool valve. The grooves 16 and 17 are normally communicated with each other; however, the communication is interrupted when the brake pedal rod 2 is operated. The groove 17 formed in the power piston 9 is communicated with a hydraulic pressure chamber 11 which is defined by the plug 3 and the power piston 9.

Figure 2:
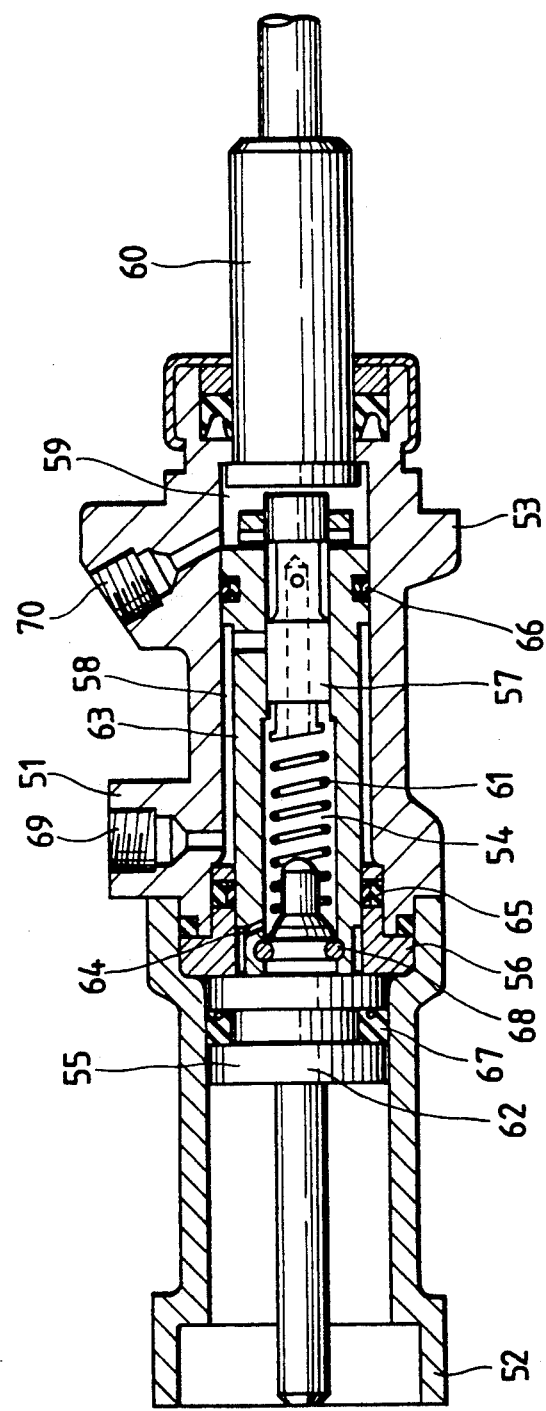
FIG. 2 is a sectional side view of a conventional fluid operated booster.

The plug 3 secured to the housing 1, and the brake pedal rod 2 define an accommodating chamber which accommodates a control spool 4 as a first spool valve. The control spool 4 slides between a protrusion 26 formed on the plug 3 and a stopper 14 secured to the plug, to control the communication between the hydraulic pressure chamber 11 and a flow path 21 extended to the accumulator. A flow path is formed in the control spool 4. The control spool 4 is normally abutted against the protrusion 26 as shown in FIG. 2, and therefore the flow path formed in the control spool 4 is not communicated with the flow path 21. A friction member 15 is provided between the control spool 4 in the accommodating chamber and the brake pedal rod 2. The friction member 15 provides a frictional force necessary for opening and closing the control spool 4. Hence, when the brake pedal rod 2 is driven, the movement of the brake pedal rod is transmitted through the frictional member 15 to the control spool 4, so that the control spool 4 is moved axially between the protrusion 26 of the plug 3 and the stopper 14 secured to the plug. A seal member 24 is provided between the plug 3 and the control spool 4. The control spool 4 prevents the direct application of the high hydraulic pressure from the accumulator to the seal member 24. Hence, the frictional force between the seal member 24 and the brake pedal rod 2 is smaller than in the conventional fluid operated booster.

The operation of the fluid operated booster thus constructed will be described.

When an operating force is applied to the brake pedal rod 2, the rod 2 is moved to the left in FIG. 2. As a result, the communication between the hydraulic pressure chamber 11 and the low pressure chamber 19 through the second spool valve which is formed by the groove 16 in the brake pedal rod 2 and the groove 17 in the power piston 9 is interrupted. At the same time, the control spool 4, serving as the first spool valve, is moved with the aid of the friction member 15 until it abuts against the stopper 14, thereby to communicate the hydraulic pressure chamber 11 with the flow path 21 extended to the accumulator, with the result that the high hydraulic pressure of the accumulator is applied to the hydraulic pressure chamber 11. The high hydraulic pressure thus applied acts on the power piston 9 to move the piston 9 to the left against the elastic force of the return spring 6. The movement of the power piston 9 is transmitted through the booster rod 5 to the master cylinder piston 8 to operate the brake.

When the force of pushing the brake pedal rod 2 to the right by hydraulic pressure (which is formed by the hydraulic pressure applied to the difference in sectional area (C - B) between the large diameter portion and the small diameter portion of the brake pedal rod 2) becomes greater than the input force applied through the brake pedal rod 2, the control spool 4 is moved to the right together with the brake pedal rod 2, to close the flow path connected to the accumulator. When the force of pushing the brake pedal rod 2 to the left is increased again, the control spool 4 is moved to the left together with the brake pedal rod 2, to communicate the hydraulic pressure chamber with the accumulator. Thus, the power boosting operation is carried out while the hydraulic pressure proportional to the input force is being applied to the hydraulic pressure chamber.

As was described above, the fluid operated booster is so designed that the hydraulic pressure from the accumulator is not directly applied to the seal member 24 provided between the brake pedal rod 2 and the plug 3. Hence, the initial movement of the brake pedal rod 2 is not resisted through the seal. In addition, the seal 25 provided for the power piston is accommodated in the groove formed in the outer cylindrical wall of the power piston, and therefore the hydraulic pressure from the accumulator is not directly applied thereto, with the result that the frictional resistance there is considerably low; that is, the loss of power by sliding friction is minimized.

As was described above, in the fluid operated booster of the invention, when the brake system is not in operation, the high hydraulic pressure from the accumulator is blocked by the control spool 4; that is, the direct application of the hydraulic pressure to the seal member provided between the brake pedal rod 2 and the plug 3 is prevented. Hence, in the fluid operated booster, the seal member will not provide high frictional resistance which adversely affects the initial movement of the brake pedal rod 2. Furthermore, in the fluid operated booster of the invention, as the brake pedal rod moves, the control spool 4 is moved through the friction member to communicate the flow path of the accumulator with the hydraulic pressure chamber. This structure dispenses with the spring which the conventional fluid operated booster employs for urging the spool valve. Thus, the fluid operated booster of the invention is simple in construction, and can be miniaturized.

What is claimed is:

1. A fluid operated booster for a vehicle brake system, comprising:
   first valve means for controlling the communication between an accumulator for providing hydraulic pressure and a hydraulic pressure chamber, said first valve means comprising a spool valve mounted on said frictionally engaged for movement with a brake pedal rod within a predetermined distance, said first valve means precluding communication between said accumulator and said hydraulic pressure chamber when the brake system is not in operation, so that no hydraulic pressure from said accumulator is applied to said brake pedal rod; and
   second valve means for controlling the communication between said hydraulic pressure chamber and a reservoir,
   wherein operation of the brake system by pushing said brake pedal rod closes said second valve means and opens said first valve means, so that hydraulic pressure is applied from said accumulator to said hydraulic pressure chamber to act on a power piston; causing said power piston to transmit an operating force to a master cylinder piston.

2. A fluid operated booster for a vehicle brake system in which a brake force is applied from a brake pedal rod to a master cylinder piston slidably mounted in a master cylinder housing, comprising:
   a booster housing fixed to the master cylinder housing;
   a hollow plug fixedly mounted in said booster housing, said plug defining a hole for slidably receiving the brake pedal rod;
   a power piston disposed between said plug and the master cylinder piston, said power piston being slidably fitted in said booster housing;
   a booster rod between said power piston and the master cylinder piston;
   a return spring for urging said booster rod toward said power piston;
   a low pressure chamber formed in said booster housing and said master cylinder housing and disposed between said power piston and the master cylinder piston, said low pressure chamber communicating with a reservoir tank, said low pressure chamber communicating with a first fluid passage formed in the brake pedal rod;
   a fluid pressure chamber formed in booster housing for receiving a pressurized fluid which urges said power piston against said return spring;
   first spool valve means for controlling the fluid communication between a second fluid passage connected to an accumulator and said fluid pressure chamber, said first spool valve means being slidably mounted on the brake pedal rod; and
   second spool valve means for selectively communicating said fluid pressure chamber and said low pressure chamber;

3. The fluid operated booster of claim 2, wherein said second spool valve means places said fluid pressure chamber in communication with said low pressure chamber when the brake pedal rod is not actuated, and precludes communication between said fluid pressure chamber and said low pressure chamber when the brake pedal rod is actuated.

4. The fluid operated booster of claim 2, wherein said plug comprises a protrusion of an inner wall thereof and a stopper fixed to the inner wall, and said first spool valve means comprises a control spool provided between said protrusion and said stopper of said plug, said control spool being slidably mounted between the brake pedal rod and said inner wall of said plug.

5. The fluid operated booster of claim 2, wherein said second spool valve means consists substantially of a first groove formed on the brake pedal rod and a second groove formed on an inner wall of said power piston.

6. The fluid operated booster of claim 4, wherein said control spool in frictionally engaged with the brake pedal rod for movement therewith within a predetermine distance.

7. The fluid operated booster of claim 2, wherein said power piston has an annular groove on an outer wall thereof, and a seal member is fitted in said annular groove of said power piston.

8. The fluid operated booster of claim 2, wherein said first spool valve means precludes communication between said accumulator and said fluid pressure chamber when said brake pedal rod is not actuated, and places said accumulator in communication with said fluid pressure chamber when said brake pedal rod is actuated.

* * * * *

UNITED STATES PATENT AND TRADEMARK OFFICE
CERTIFICATE OF CORRECTION

PATENT NO. : 5,186,002
DATED : February 16, 1993
INVENTOR(S) : Toshifumi Maehara It is certified that error appears in the above-identified patent and that said Letters Patent is hereby corrected as shown below:

Claim 1, column 5, line 56, change "said" to --and--.

Claim 1, column 6, line 3, before "causing" change ";" to --,--.

Claim 2, column 6, line 37, after "chamber" change ";" to --.--.

Claim 4, column 6, line 45, change "of" to --on--.

Claim 6, column 6, line 58, change "mine" to --mined--.

Signed and Sealed this

First Day of February, 1994

BRUCE LEHMAN

*Attest:*

*Attesting Officer*  *Commissioner of Patents and Trademarks*